Aug. 4, 1936.  W. T. HONISS  2,050,211
GLASS FEEDING FOREHEARTH
Filed Oct. 26, 1934
Fig. 1.
Fig. 2.
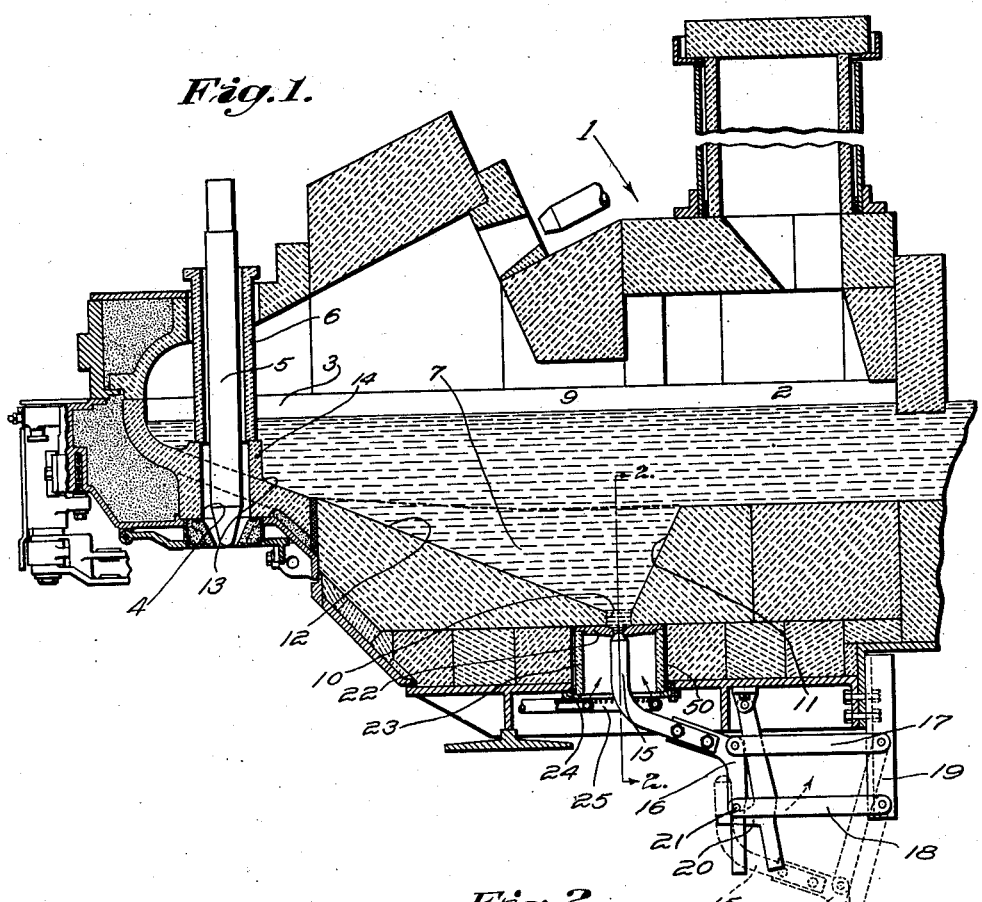
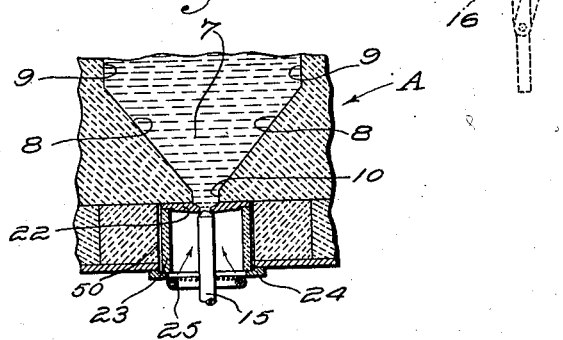
Witness:
W. B. Thayer
Inventor:
William T. Honiss
by Brown Paulaw
Attorneys Patented Aug. 4, 1936

2,050,211

UNITED STATES PATENT OFFICE 2,050,211

GLASS FEEDING FOREHEARTH

William T. Honiss, West Hartford, Conn., assignor to Hartford-Empire Company, Hartford, Conn., a corporation of Delaware Application October 26, 1934, Serial No. 750,125

8 Claims. (Cl. 49—55)

Articles of glassware which have been formed from mold charges obtained from glass that has issued from a submerged or bottom discharge outlet of a glass feeding forehearth may have defects in the nature of surface markings or "hair lines" which are attributable to the presence of refractory contaminated and chilled portions of glass in the charges from which the articles were made.

An object of the present invention is to obviate such defects in articles of glassware so formed by providing a glass feeding forehearth in which provision is made for eliminating refractory contaminated and chilled portions of glass from the glass issuing from the submerged glass discharge outlet.

A further object of the invention is to provide in a glass feeding forehearth of the character described novel and effective means for preventing the accumulation of a chilled refractory contaminated layer of glass at and adjacent to the intake end of the discharge outlet and for effecting removal of refractory contaminated glass from the bottom of the forehearth channel without permitting any portion thereof to mingle with the glass entering the submerged discharge outlet.

Other objects and advantages of the invention will hereinafter be pointed out, or will become apparent from the following description of a particular embodiment of the invention, as shown in the accompanying drawing, in which:

Figure 1 is a longitudinal vertical section through a glass feeding forehearth that is constructed in accordance with the invention; and Fig. 2 is a fragmentary transverse sectional view of a bottom portion of the forehearth structure, the view being substantially along the line 2—2 of Fig. 1.

In the drawings, the numeral I designates a glass feeding forehearth having a glass flow channel 2 for conducting molten glass from a source of supply, such as a melting tank (not shown) to a delivery chamber feed bowl or spout 3 which constitutes the outer end portion of the forehearth structure. The forehearth structure, in general, may include any suitable known structural parts and appurtenances so as to assure proper conditioning and temperature regulation of the glass therein and so as to permit desirable connection of the forehearth with the associated melting tank or other source of supply of molten glass. Thus, the forehearth structure may include suitable supporting structure, suitable insulating material, suitable refractory walls and other known structural parts, and may be equipped with suitable known burners or other heating devices, and/or cooling devices. As is usual in a glass feeding forehearth of the general type above referred to, a discharge or feed outlet, such as indicated at 4 in Fig. 1, is provided in the base or bottom of the feed spout or bowl portion of the forehearth. The arrangement is such that this outlet is constantly submerged by a body of molten glass in the feed bowl or spout when the forehearth structure is in use and issuance of glass from the feed bowl or spout through the outlet may be regulated or controlled in any suitable known manner, as by structure that includes a vertically reciprocable refractory implement 5 and a refractory sleeve or tube 6.

The structure that has been described so far does not per se form any part of the present invention, structural features of which will now be described.

In carrying out the invention, I provide a drainage well or sump 7 at the bottom of the glass flow channel between the source of supply of molten glass and the outlet and preferably adjacent to the latter. This drainage well or sump may have a width at its top practically co-extensive with the width of the glass flow channel so that the side walls of the drainage well, indicated at 8, Fig. 2, slope from their junctures with the side walls 9 of the glass flow channel toward a drain outlet 10 at the bottom of the drainage well. The rear wall 11 of the drainage well also slopes toward the drain outlet 10 and may be inclined less from the vertical than the side walls 8. The front wall 12 of the drainage well or sump likewise slopes toward the drainage opening 10 but may be of considerably greater extent than the rear wall 11 and be formed so as to have but a relatively slight inclination from the horizontal, as compared with the remaining walls of the drainage well.

Also, I prefer to form the bottom of the feed bowl or spout, i. e., the bottom of the outer end portion of the glass containing portion of the forehearth structure, so that it slopes rearwardly from a level approximating the level of the glass in the forehearth to the adjacent end of the drainage well or sump. Thus, in Fig. 1, I show a feed spout or bowl having a bottom wall, indicated at 13, which is inclined at about the same angle as the front wall 12 of the drain well or sump so as to form, in effect, a forward extension of the latter.

The feed outlet 4 in the bottom of the feed bowl or spout of the forehearth structure is provided with a curb or upstanding annular baffle 14, the upper end of which is below the level of the glass in the forehearth but substantially above the sloping adjacent portion of the bottom wall of the forehearth.

The drain opening 10 may be closed at times by a suitable closure, exemplified by the stopper 15. Such closure may be carried by a handle or supporting member 16, which in turn may be connected, as by the parallel links 17 and 18 with a fixed bracket or supporting member 19 so that the handle of the stopper or closure may be manipulated to swing it from its active glass flow-preventing position, indicated by the full lines in Fig. 1, to a rearwardly swung inactive or flow permitting position, as indicated by the dotted lines in Fig. 1. The stopper or closure may be retained in its active position by the engagement of a pivoted latch 20 with a cooperative abutment, such as the horizontal pin 21, that is carried by the handle of the stopper or closure.

When the closure or stopper has been withdrawn from its active position, it will have been moved completely to the rearward of the vertical line of the drainage opening so as not to interfere with any suitable device, such as a trough or chute, not shown, which may be disposed beneath the drainage outlet to carry away the contaminated glass that has drained from the outlet 10.

Preferably, the effective orifice at the bottom of the drain outlet 10 is an aperture in a high strength heat resistant metallic plate 22 which is supported, as by the refractory retaining cylinder 23 and the removable annular supporting and fastening ring 24, at the upper end of a circular open bottomed chamber 50 in the portion of the bottom structure of the forehearth that lies directly beneath the outlet of the drainage well 7. An annular nozzle 25 preferably is disposed at the inner periphery of the lower end of this chamber and is provided with a suitable supply pipe through which either cooling fluid or a combustible gaseous or other fuel mixture may be supplied, according to the particular service requirements at a given time. With this arrangement, the stopper 15 is permitted to seat closely against the wall of the effective orifice of the drainage outlet and the metallic plate 22 and the open space therebeneath (to which cooling fluid may be admitted) will further aid in chilling the glass in the drainage outlet so as to produce an effective seal when the stopper is in its closed position. When it is desired to assure flow of glass through the drainage outlet, the metallic plate 22 may be heated (by heat from the glass and also by the combustion of a fuel mixture supplied by the nozzle 25) so that when the stopper or closure is withdrawn, a relatively free flow of glass from the drainage outlet will ensue.

From the foregoing description of various parts of the illustrated structural embodiment of the invention, the operation thereof may be readily understood. Glass within the forehearth will enter the upper end of the feed outlet 4 at a level substantially above the bottom of the forehearth. Below this level, a layer of glass that has been chilled and contaminated because of contact with the refractory walls of the feed spout or bowl will be conducted rearwardly around and past the curb or upstanding annular baffle at the upper end of the feed outlet into the drainage well or sump. Also, glass that has been contaminated by contact with refractory walls of the flow channel while in transit from the source of supply toward the feed spout or bowl will be caught in the drainage well or sump, being heavier than the uncontaminated glass. Flow from the outlet of the drainage well or sump may be continuous, or may be permitted only at intervals, the frequency of which will be predetermined according to the amount of contaminated glass to be withdrawn from the forehearth.

With the arrangement shown, articles of glassware formed from charges of glass produced by the feeding apparatus, of which the forehearth hereinbefore described is a part, will be practically free from hair lines and such surface defects as are attributable to the presence of refractory contaminated and chilled portions of glass in the charges.

It is obvious that the particular structural details of the practical embodiment of the invention that has been described may be varied, modified and altered without departing from the spirit and scope of the invention. I therefore do not wish to be limited to such details but consider, as within the scope of the invention, all such structures as come within the terms of the appended claims.

I claim:

1. A glass feeding forehearth having a channel adapted to receive molten glass from a source of supply, said forehearth having a feed outlet in the bottom of the channel adjacent to the outer end thereof, said feed outlet having an upstanding curb at its upper end, the bottom of said channel having a drainage outlet at a place rearwardly of said feed outlet and sloping continuously from said feed outlet toward said drainage outlet.

2. A glass feeding forehearth having a flow channel for receiving molten glass from a source of supply, the outer end portion of said flow channel constituting a glass delivery chamber and having an outlet in its bottom adapted to be submerged by the glass in said chamber, a drainage well in the bottom of said channel between said feed outlet and the source of supply of said molten glass, said drainage well having a drainage outlet at its lower end, the bottom of the outer end portion of said channel surrounding said feed outlet sloping continuously rearwardly toward said drainage well, said feed outlet having an upstanding curb at its upper end terminating below the normal level of the molten glass in said channel.

3. A glass feeding forehearth having a channel adapted to receive molten glass from a source of supply, the outer end portion of said channel constituting a glass delivery chamber and having an outlet in its bottom adapted to be submerged by the glass in said chamber, said outlet having an upstanding curb and the bottom of said delivery chamber sloping continuously from its forward end past said upstanding curb and rearwardly thereof.

4. A glass feeding forehearth having a channel adapted to receive molten glass from a source of supply, the outer end portion of said channel constituting a glass delivery chamber and having an outlet in its bottom adapted to be submerged by the glass in said chamber, said outlet having an upstanding curb and the bottom of said delivery chamber sloping continuously from its forward end past said upstanding curb and rearwardly thereof, and means at the rearward end of the sloping bottom wall of said delivery chamber for collecting refractory-contaminated glass that drains thereinto from said delivery chamber and for preventing said refractory contaminated glass from commingling with the glass at the level of the upper end of said upstanding curb.

5. A glass feeding forehearth having a channel for receiving molten glass from a source of supply, the outer end portion of said channel constituting a glass delivery chamber having an outlet in its base adapted to be submerged by the glass in said chamber, an upstanding curb around the upper end of said outlet, a drainage well in the bottom of said channel rearwardly of said delivery chamber, said drainage well having a drainage outlet at its lower end and having walls sloping continuously from their upper edges toward said drainage outlet, said drainage well extending substantially the full width of said forehearth channel.

6. A glass feeding forehearth having a channel adapted to receive molten glass from a source of supply, the outer end portion of said channel constituting a glass delivery chamber having an outlet in its base adapted to be submerged by the glass in said chamber, a drainage well at the bottom of said channel rearwardly of said delivery chamber, said drainage well having a drainage outlet at its lower end, having sloping side walls joined at their upper edges to the side walls of said channel and having a rearwardly sloping front wall, the bottom wall of said delivery chamber also sloping continuously rearwardly and extending to the rearwardly sloping front wall of said drainage well, and an upstanding curb at the upper end of the feed outlet in the bottom of said delivery chamber.

7. A glass feeding forehearth having a channel adapted to receive molten glass from a source of supply the outer end portion of said channel constituting a delivery chamber and having an outlet in its base adapted to be submerged by the glass therein, an upstanding curb around the upper end of said outlet, said channel having a drainage well at its bottom at the rear of said delivery chamber for receiving refractory-contaminated glass at the bottom of said forehearth channel, the bottom of said channel sloping continuously from said outlet to said drainage well, said drainage well having a drainage outlet at its lower end, a closure for the lower end of said drainage outlet, and mechanism for movably supporting said closure to permit it to be swung between a position in which it closes said drainage outlet and an out-of-the-way inactive position laterally of the vertical line of said drainage outlet.

8. A glass feeding forehearth having a channel adapted to receive molten glass from a source of supply, the outer end portion of said channel constituting a delivery chamber and having an outlet in its base adapted to be submerged by the glass therein, said channel having a drainage well at its bottom at the rear of said delivery chamber for receiving refractory-contaminated glass at the bottom of said forehearth channel, said drainage well having a drainage outlet at its lower end, said forehearth having a heat resistant metallic plate supported beneath said drainage well, said plate having an aperture constituting the lower end portion of said drainage outlet, said forehearth structure being provided with an open-bottomed chamber directly beneath said metallic plate, and a fluid supply nozzle at the lower end of said open-bottomed chamber of such character as to direct fluid upwardly into said open-bottomed chamber, and a stopper supported for movement through said open bottomed chamber to and from position to seat against the wall of the aperture in said metallic plate and thus to close the lower end of said drainage outlet.

WILLIAM T. HONISS.